United States Patent Office 2,982,685
Patented May 2, 1961

2,982,685

ARYLPHOSPHATE COMPOUNDS

Richard R. Whetstone and Alan R. Stiles, Modesto, Calif., assignors to Shell Oil Company, New York, N.Y., a corporation of Delaware No Drawing. Filed Dec. 23, 1957, Ser. No. 704,341

14 Claims. (Cl. 167—30)

This invention relates to novel complex halogenated aryl compounds which contain phosphorus and to the employment of these compounds as insecticides. Certain organic phosphorus-containing compounds have become important in recent years because of their potency as insecticides. For example, Stiles, U.S. 2,685,552 (Shell Development Company), describes dimethyl-1-carbomethoxy-1-propen-2-yl phosphate as an insecticide of outstanding toxicity. In spite of their impressive initial toxicity, many of these phosphorus compounds are effective for only a short time and are consequently rendered less valuable or altogether useless in those situations calling for extended residual toxicity. The need for potent phosphorus-containing insecticides manifesting extended residual toxicity has thus become increasingly manifest. The novel insecticides of the present invention satisfy this urgent need without sacrificing the characteristic potency and other advantages of these known organic-phosphorus insecticides. The principal object of the present invention is then to provide organic phosphorus-containing insecticidal compounds evidencing high initial potency, extended residual toxicity, yet which are relatively inexpensive to synthesize and formulate.

Another object of the present invention is to provide insecticidal compositions containing these compounds.

Yet another object of the present invention is to provide a method of combating insects comprising essentially contacting insects with these novel compounds.

Other objects, features and advantages of the present invention will be apparent from the following description read in conjunction with the appended claims.

The new and novel compounds encompassed by the present invention may be represented by the following structural formula:

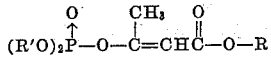

wherein R is a halogenated (preferably chlorinated) aralkyl or aryl group. When R is an aralkyl group the alkyl portion may contain 1–5 carbon atoms and is a branched or straight chain. The alkyl portion of the aralkyl group is preferably methyl. The aryl portion of the molecule may be a phenyl or tolyl group. A benzyl group is preferred. The aryl group is partially or completely halogenated, preferably with chlorine. R' is a lower alkyl radical which may contain 1–5 carbon atoms. Methyl is preferred. Specific examples of compounds encompassed by the present invention are:

2 - (p - chlorophenoxycarbonyl)-1-methylvinyl-dimethyl phosphate,
2-(p-chlorobenzyloxycarbonyl) - 1 - methylvinyl dimethyl phosphate,
2 - (o-chlorobenzyloxycarbonyl)-1-methylvinyl dimethyl phosphate,
2-(2,3-dichlorobenzyloxycarbonyl-1-methylvinyl dimethyl phosphate,
o-(3,4-dichlorobenzyloxycarbonyl)-1-methylvinyl dimethyl phosphate,
2 - (p - chloro-alpha-methylbenzyloxycarbonyl)-1-methylvinyl dimethyl phosphate,
2-(5-(p-fluorophenyl)pentyloxycarbonyl)-1 - methylvinyl dimethyl phosphate,
2-(p - iodobenzyloxycarbonyl) - 1 - methylvinyl dimethyl phosphate,
2-(o-bromobenzyloxycarbonyl) - 1 - methylvinyl dimethyl phosphate,
Dimethyl-1-methyl-2 -(2,3,4,5,6-pentachlorobenzyloxycarbonyl)vinyl phosphate,
2-(p - chlorotolyloxycarbonyl) - 1 - methylvinyl dimethyl phosphate,
2 - (p - chlorophenoxycarbonyl) - 1 - methylvinyl dipentyl phosphate,
2-(p-chlorobenzyloxycarbonyl-1-methylvinyl diethyl phosphate.

The novel compounds of the present invention can be prepared by any of the methods known in the art for synthesizing compounds of this general character. If desired, compounds of the present invention may be prepared by reacting trialkyl phosphite with the appropriate haloarylhaloacetoacetate as shown in the following formula:

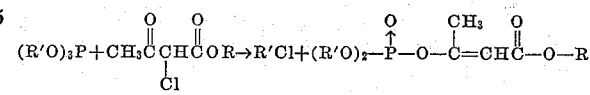

In this equation R is a halogenated aralkyl or aryl radical as defined above and R' is a lower alkyl radical as defined above.

The preparations of the compounds of the present invention are illustrated by the following examples:

I. 2-(p-CHLOROPHENOXYCARBONYL)-1-METHYL-VINYL DIMETHYL PHOSPHATE

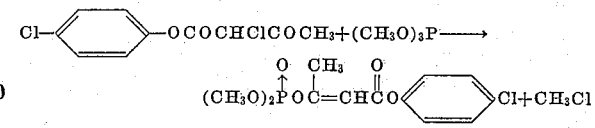

p-Chlorophenyl 2-chloroacetoacetate (135 g., 0.545 mole) was placed in a 3-neck round bottom 300 cc. flask fitted with stirrer, dropping funnel and a 4-tube carrying a thermometer and a reflux condenser attached to a Dry Ice acetone trap. The stirred material was heated to 80° C. and trimethyl phosphite (70 cc., 70.5 g., 0.593 mole) added slowly with stirring during a period of 75 minutes. The temperature was controlled between 80° C. and 110° C. After addition, the reaction mixture was heated to 120–125° C. for one hour. Cold trap contents, 23 g., B.P. −24° C. (CH₃Cl). The bottoms were stripped to 60°/.05 mm. The stripped product was then stripped on the molecular still at 35°/.005 mm., then at 100°/0.0005 mm. The distillation was carried out at 130–135°/.005 mm. Calc. 11.5%. Cl found 12.0. Calc. 10.02% P, found 9.3% P. The product was then stripped at 112–115°/0.0001 mm. and distilled at 125–130°/0.0001 mm. Yield 55%. Analysis $C_{12}H_{14}PO_6Cl$.

| Percent | Calc. | Found |
|---|---|---|
| C | 44.94 | 43.8 |
| H | 4.40 | 4.8 |
| Cl | 11.06 | 12.1 |
| P | 9.66 | 9.4 $n_D^{25}$ 1.5186 |

It will be understood that the corresponding diethyl-, dipropyl-, dibutyl-, and dipentyl phosphates may be prepared by employing triethyl-, tripropyl-, tributyl-, and tripentyl phosphite separately.

II. 2-p-CHLOROBENZYLOXYCARBONYL-1-METHYLVINYL DIMETHYL PHOSPHATE

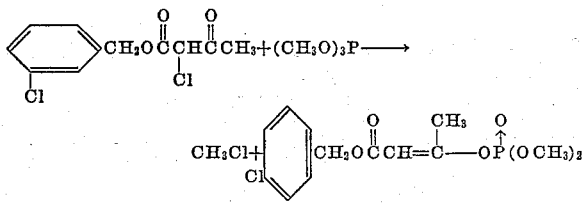

p-Chlorobenzyl 2-chloroacetoacetate (130 g., 0.497 mole( was placed in a 300 cc. round bottom three-necked flask fitted with dropping funnel, mechanical stirrer and 4-tube carrying a thermometer and a reflux condenser attached to a Dry Ice-acetone cold trap for collecting $CH_3Cl$. The stirred material was heated to 80° and trimethyl phosphite added dropwise (71 cc., 92% pure), the temperature of the reaction being controlled between 80° and 100° during the addition (1 hour). The reaction mixture was heated to 120–130° and stirred for an additional hour. The product was stripped to 100° by house vacuum and then to 100°/.05 mm. but no distillate collected. The cold trap contents before stripping weighed 23 g. The reaction mixture was then stripped on the molecular still, 171 g. crude giving 167 g. residue after stripping at 58–60°/.0005 mm. This residue was distilled on the molecular still at 138–140°/.0005 mm. The distillate obtained weighed 152 g. The residue, weighing 11 g. was discarded. Yield 91.5%. Analysis $C_{13}H_{16}PO_6Cl$;

|  | Percent C | Percent H | Percent Cl | Percent P |
|---|---|---|---|---|
| Calc | 46.65 | 4.82 | 10.6 | 9.26 |
| Distillate | 47.3 | 5.2 | 10.8 | 8.4 |
| Residue | 46.8 | 5.1 | 10.9 | 9.2 |

It will be understood that the corresponding diethyl-, dipropyl-, dibutyl-, and dipentyl phosphates may be prepared by employing triethyl-, tripropyl-, tributyl-, and tripentyl phosphite respectively.

III. o-CHLOROBENZYL 3-(DIMETHOXYPHOSPHINYLOXY) CROTONATE

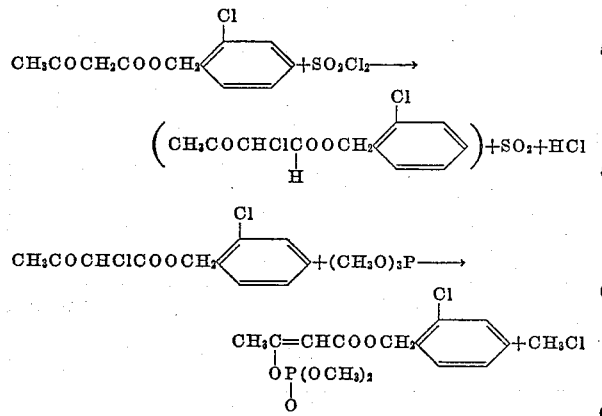

The o-chlorobenzyl acetoacetate (127 g., 0.56 mole) was poured into a round bottomed flask equipped with a stirrer, thermometer and addition-tube and condenser leading to a water trap for escaping $SO_2$ and HCl. The liquid was cooled to 10° and 43.0 cc. of $SO_2Cl_2$ (0.53 mole; 71.5 g.) was added dropwise during the course of 1 hour. The temperature was maintained at 10–15° using ice-cooling when necessary. After the final addition, the temperature was allowed to rise to ambient temperature (25°) in the course of ½ hour. The product was degassed up to a temperature of 50° using house vacuum for ½ hour, then maintained at 50° for another ½ hour at 72 mm. The slightly yellow solution was now heated to 60° and 66.0 g. (0.56 mole) of $(CH_3O)_3P$ was added during the course of one hour controlling the temperature between 60–65° with stirring. The escaping $CH_3Cl$ was collected in a Dry Ice-acetone trap. After the final addition, the temperature was raised to 70–75° for ½ hour and then vacuum applied (to remove as much as possible of the $CH_3Cl$) for ½ hour. 24.0 g. of $CH_3Cl$ (90.5% of theory) was obtained. The slightly colored solution was stripped at 100–125°/$10^{-5}$ mm. The product was distilled at 150°/$10^{-5}$ mm. There were obtained 49 g. (43.0 cc.) of residue (light yellow in color) and 87.0 g. (75 cc.; $d=1.2$) of almost colorless distillate. More distillate is obtained if slower distillation is employed. Yield=52%. $C_{13}H_{16}ClO_6P$ calc.: C, 46.7, H, 4.6; Cl, 10.6; P, 9.3. Found: C, 46.9; H, 4.9; Cl, 10.6; P, 8.5.

It will be understood that the corresponding homologs may be made by employing triethyl-, tripropyl-, tributyl-, and tripentyl phosphite, respectively.

IV. 2,4-DICHLOROBENZYL 3-(DIMETHOXYPHOSPHINYLOXY) CROTONATE

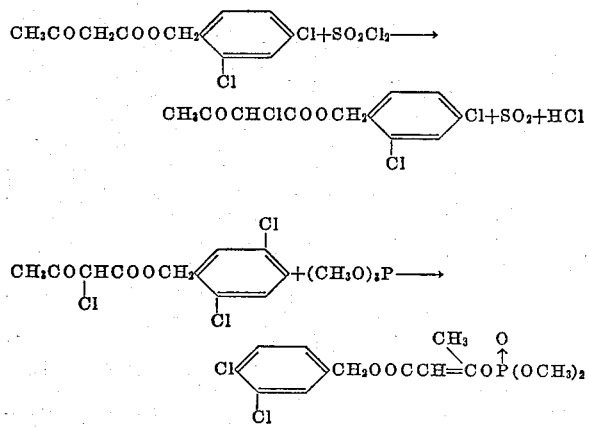

2,4-dichlorobenzyl acetoacetate (94 g.; 0.36 mol) was cooled to 10° and while stiring 45.5 g. (27.0 cc.; 0.337 mol) of $SO_2Cl_2$ were added dropwise during the course of 30–40 minutes. The temperature was maintained at 10–15° C. After the final addition the temperature was allowed to come to ambient temperature (½ hour) and the $SO_2$ and HCl removed by applying house vacuum for ½ hour at 50° and Hy-Vac (5 mm.) at 50° for another ½ hour. The resulting yellow oil was stirred and heated to 70° and $(CH_3O)_3P$ (45.0 g.; 0.36 mol) was added dropwise during ½ hour while maintaining the temperature between 75–80°. After the final addition the reaction mixture was maintained at 75–80° for ½ hour and allowed to stand overnight.

The reaction mixture was stirred and heated to 75° and house vacuum applied for ½ hour. 16.0 g. of $CH_3Cl$ was obtained in the trap (95% theory). The oil was then stripped at 110°/$10^{-5}$ mm. The stripped material distilled at 170–180°/$10^{-5}$ mm. to yield 95.0 g. of yellow oil. Volume=70 cc., $d=1.3$, $n_D^{25}=1.5273$. Yield= 76.7%. 10 cc. of residue and 5 cc. of colorless liquid in the trap were also obtained. Calc.: for $C_{13}H_{15}Cl_2O_6P$: C, 42.3; H, 4.1; Cl, 19.3; P, 8.4. Found: C, 42.4; H, 4.6; Cl, 20.1; P, 8.0. The sample was redistilled at 150–5°/$10^{-5}$ mm. These was obtained 58.0 ml. of yellow oil having a weight of 80.0 g. (yield=65%; $d=1.3$), $n_D^{25}$ 1.5272.

It will be understood that the corresponding homologs may be made by employing triethyl-, tripropyl-, tributyl-, and tripentyl phosphite, respectively.

V. 3,4-DICHLOROBENZYL 3-(DIMETHOXYPHOSPHINYLOXY) CROTONATE

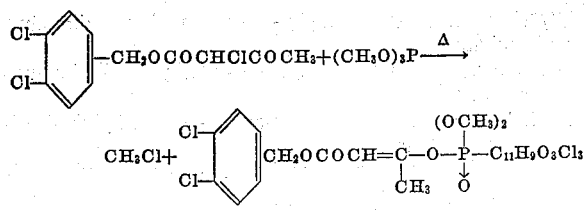

3,4-dichlorobenzyl 2-chloroacetoacetate (78 g., 0.264 mole) was treated with trimethyl phosphite (36 g., 34 cc., representing a 10% excess) at 80°. The reaction was exothermic and external cooling was required to keep the temperature of the mixture at or below 100° during the addition, which required 18 minutes. After addition was complete the temperature was raised to 125° for one hour. 11 g. of material, boiling below room temperature were collected in the cold trap. (Calc. for $CH_3Cl$, 13.3 g.) The reaction mixture was then stripped for 30 minutes at 125° and house vacuum employed. An additional 1 g. of material was collected in the cold trap. The reaction mixture was then stripped on the molecular still at 117–120°/.0005 mm. yielding a distillate of 8 g., $n_D^{25}$ 1.5265, $d$ 1.45 and a residue of 84 g. Crude yield 86.2%. The residue was distilled on the molecular still at 160°/.0005 mm. to give a distillate, 77 g., $n_D^{25}$ 1.5278, $d$ 1.32 and a residue 4 g., $n_D^{25}$ 1.5431, $d$ 1.33, which was discarded. Yield 79%. The distillate analyzed as follows: $C_{13}H_{15}PO_6Cl_2$ (369.15).

|       | Percent C | Percent H | Percent Cl | Percent P | $n_D^{25}$ |
|-------|-----------|-----------|------------|-----------|------------|
| Calc  | 42.29     | 4.10      | 19.21      | 8.39      |            |
| Found | 42.7      | 4.2       | 20.2       | 8.1       | 1.5278     |

It will be understood that the corresponding homologs may be made by employing triethyl-, tripropyl-, tributyl-, and tripentyl phosphite, respectively.

VI. p-CHLORO-ALPHA-METHYLBENZYL-3-(DIMETHOXYPHOSPHINYLOXY) CROTONATE

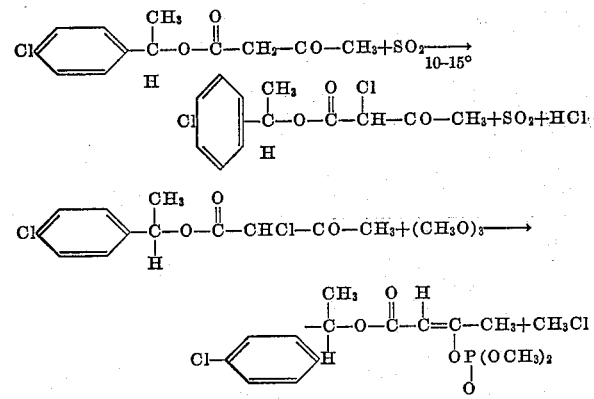

p-Chloro-alpha-methylbenzyl acetoacetate (97 g., 0.404 mol) was placed in a flask equipped with stirrer, reflux condenser, thermometer and addition tube. The stirrer was started and temperature maintained between 10–15° while 50.0 g. (300 cc., 0.371 mol) of $SO_2Cl_2$ (redistilled 62–4°) was added dropwise during the course of 45 minutes. The coolant was removed and the temperature was allowed to rise to ambient temperature (approximately ½ hour). The stirred solution was then heated to 50–55° for 15 minutes during which time $SO_2$ and HCl were removed by vacuum through a Dry Ice-acetone trap. This was followed by the removal of residual $SO_2$+HCl using Hyvac (>2 mm.) at 50° for 15 minutes. The slightly colored solution was heated and stirred at 65–70° while $(CH_3O)_3P$ (49.5 g.; 0.40 mol) was added during the course of 1½ hours. The reaction mixture was then stirred and heated at 70–75° for ½ hour, cooled and allowed to stand overnight.

The yellow reaction mixture was heated to 75–80° with stirring and house vacuum applied for ½ hour. The total weight of $CH_3Cl$ obtained in the Dry Ice trap was 19.0 g. (Theory required 18.5 g.) The yellow solution was stripped at 130°/10⁻⁵ mm. 80 cc. (100 g.) of a yellow (stripped) viscous liquid and 20 cc. (20.0 g.) of distillate (yellow in color) was obtained.

This residue was distilled at 150°/10⁻⁵ mm. yielding 69 cc. (86.0 g.) of yellow distillate and 10.0 cc. of brown residue plus 11.0 cc. of colorless liquid in trap with odor of $(CH_3O)_3P$. The distillate was redistilled and stripped at 140°/10⁻⁵ mm. Overall yield 31%. Analysis: $C_{14}H_{18}ClO_6P$.

|       | C    | H   | Cl   | P   |
|-------|------|-----|------|-----|
| Calc  | 48.3 | 5.2 | 10.0 | 8.9 |
| Found | 47.9 | 4.4 | 10.2 | 8.5 |

It will be understood that the corresponding homologs may be made by employing triethyl-, tripropyl-, tributyl-, and tripentyl phosphite, respectively.

VII. 2,3,4,5,6-PENTACHLOROBENZYL 3(DIMETHOXYPHOSPHINYLOXY) CROTONATE

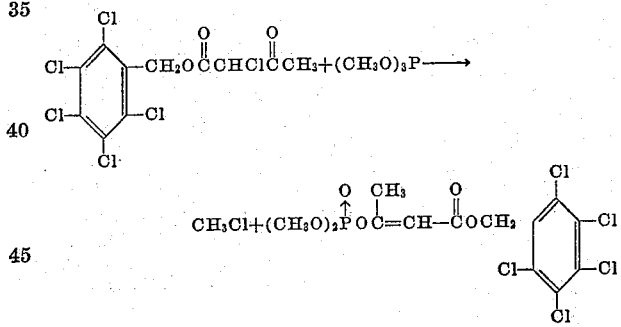

69 g. of pentachlorobenzyl 2-chloroacetoacetate and 500 cc. xylene was placed in a 1 liter three necked round bottom flask fitted with dropping funnel, mechanical stirrer and four tube bearing a thermometer and reflux condenser attached to a Dry Ice acetone cold trap. The mixture was stirred and heated to 80° C. 26.5 g. of trimethyl phosphite was added dropwise with continued heating. After twenty minutes the temperature of the reaction was raised to 130–135° and maintained at this temperature for four hours. After cooling the contents of the flask was transferred to a distillation kettle and the reaction flask rinsed out with xylene. The washings were added to the reaction mixture. The viscous oily residue solidified on standing and was subsequently washed with ether leaving a white solid, melting point 118–121°. Cooling of the ether washings gave a white precipitate which was removed by suction filtration. The solid was dissolved in acetone and crystallized on standing. The white solid was filtered and dissolved in acetone and left to crystallize. The white solid was collected and the filtrate was combined with previous filtrates and evaporated. Ether was added to the oily residue to produce crystallization. After completion of filtration the remaining solid was washed with ether and the filtrated wash was combined and stripped. The non solid residue was distilled on a molecular still.

Yielded 8 g. of distillate, 42 g. of brownish liquid wash. Analysis is as follows:

|        | Percent C | Percent H | Percent Cl | Percent P |
|--------|-----------|-----------|------------|-----------|
| Calc.  | 33.04     | 2.56      | 37.52      | 6.56      |
| Found. | 33.3      | 5.3       | 39.2       | 4.2       |

That the compounds of the present invention possess insecticidal activity is shown by the following table. The relative toxicity, i.e., toxicity index, given in this table for each compound represents the ratio of the concentration in weight percent of the standard at which under standard test conditions, a 50% mortality of the insects in each test was observed, to the concentration in weight percent of the toxic agent in the solvent at which, under standard test conditions, a 50% mortality of the insects in each test was observed.

Relative toxicity (toxicity index)

$$= \frac{LD_{50} \text{ of the standard}}{LD_{50} \text{ of a test sample}} \times 100$$

In these tests dieldrin was used as a standard for tests against houseflies and southern army worms. Parathion was employed as a standard with pea aphids, Mexican bean beetle larvae and two-spotted spider mites. The quantity of standard employed to give 50% mortality of the insects in each test was arbitrarily given a numerical value of 100. The toxicity of a representative product of the invention against the common housefly (*Musca domestica*) was determined generally following the method described by Y. P. Sun, Journal of Economic Entomology, volume 43, page 45 et seq. (1950). Solutions or emulsions of representative compounds were made up by employing acetone, a neutral petroleum distillate lying within the kerosene range as a solvent. These solutions were tested for toxicity against insects listed in the table by spraying groups of plants infested with the insects under controlled conditions which varied from test to test only in the concentration of toxicant.

In the case of two-spotted spider mites rotating pre-infested bean plants were sprayed at low volume through a horizontal tunnel with water solutions or suspensions of the toxicants by the method described by Dorman and Hall (Journal Economic Entomology 46; 151, 1953). Mammalian toxicity tests were also conducted on male mice.

As this table clearly shows outstanding insecticidal activity, particularly against mites was evidenced by:

2-(p-chlorophenoxycarbonyl) - 1 - methylvinyl dimethyl phosphate
2-(o-chlorobenzyloxycarbonyl) - 1 - methylvinyl dimethyl phosphate
2 - (2,4 - dichlorobenzyloxycarbonyl) - 1 - methylvinyl dimethyl phosphate
2 - (3,4 - dichlorobenzyloxycarbonyl) - 1 - methylvinyl dimethyl phosphate That the compounds of the present invention exhibit a surprising residual toxicity when compared with 2-(methoxycarbonyl)-1-methylvinyl dimethyl phosphate, is illustrated by tests conducted against the boll weevil, two-spotted mite, and Mexican bean beetle.

The initial and residual toxicity of each of the compounds of the present invention to boll weevils when sprayed at the rate of 0.5 lb./acre on boll weevils caged on field treated cotton plants was ascertained. 2-(methoxycarbonyl)-1-methylvinyl dimethyl phosphate was found to be ineffective two days after spraying whereas the compounds of the present invention exhibited significant toxicity after three days.

Against the two-spotted mite, pre-infested bean plants were treated with low volume sprays of the test chemical at concentrations of 20 and 40 times its $LD_{50}$ value, i.e. the amount by weight of test chemical effecting a 50% initial insect kill. Seven days after spray, total living mites were counted and expressed as percent reduction from the check. The compounds of the present invention were superior to 2-(methoxycarbonyl)-1-methylvinyl dimethyl phosphate in all recorded tests.

In the case of the Mexican bean beetle larvae bean plants were sprayed to run off with dosages ten times their $LD_{50}$ value. Bean beetle larvae were placed on these plants at intervals of one, two, and seven days. All compounds of the present invention evidenced insecticidal activity seven days after spraying whereas 2-(methoxycarbonyl)-1-methylvinyl dimethyl phosphate evidenced no activity at this time. The following table summarized the experiments illustrating the residual toxicity of the compounds of the present invention when compared to 2-(methoxycarbonyl)-1-methylvinyl dimethyl phosphate.

*Insecticidal toxicity of complex halogenated aryl compounds*

[Toxicity index (standard=100)]

| Compound Name | House Fly Dieldrin[1] | Pea Aphid Parathion[1] | Mexican Bean Beetle Larva Parathion[1] | Southern Army-worm Dieldrin[1] | Two-Spotted Spider Mite Parathion[1] | Toxicity Male Mice, Mg./Kg. |
|---|---|---|---|---|---|---|
| 2-(p-Chlorophenoxy-carbonyl)-1-methylvinyl dimethyl phosphate | 10.5 | 15 | 48 | 7 | 33 | 250–500 |
| 2-(p-Chlorobenzyloxy-carbonyl)-1-methylvinyl dimethyl phosphate | 22 | 56 | 53 | 14 | 254 | 212 |
| 2-(o-Chlorobenzyloxy-carbonyl)-1-methylvinyl dimethyl phosphate | 11 | 85 | 60 | 19 | 113 | 77 |
| 2-(2,4-Dichlorobenzyloxy-carbonyl)-1-methylvinyl dimethyl phosphate | 9.6 | 20 | 65 | 14 | 90 | 117 |
| 2-(3,4-Dichlorobenzyloxy-carbonyl)-1-methylvinyl dimethyl phosphate | 9.6 | 12 | 52 | 22 | 111 | 117 |
| 2-(p-Chloro-alpha-methylbenzyl-oxycarbonyl)-1-methyl-vinyl dimethyl phosphate | 24 | 56 | 107 | 74 | 74 | 154 |

[1] Standard.

*Residual percent mortality or reduction*

| Compound Name | Boll Weevil at 0.5 lb./acre—Days after spray | | | | 2-Spotted mite 7 days at factor $\times LD_{50}$ | | Mexican Bean Beetle at 10 $\times LD_{50}$ at days after spray | | |
|---|---|---|---|---|---|---|---|---|---|
| | 0 | 1 | 2 | 3 | 20× | 40× | 1 | 2 | 7 |
| 2-(Methoxycarbonyl)-1-methyl-vinyl dimethyl phosphate | 96 | 36 | 0 | | 59 | 78 | | | 0 |
| 2-(p-Chlorobenzyloxycarbonyl)-methyl-vinyl dimethyl phosphate | 85 | 90 | 35 | 55 | 97 | 100 | 93 | 90 | 23 |
| 2-(o-Chlorobenzyloxycarbonyl)-1-methyl-vinyl dimethyl phosphate | 80 | 50 | 90 | 30 | 93 | 99 | 100 | | 67 |
| 2-(2,4-Dichlorobenzyloxycarbonyl)-1-methyl-vinyl dimethyl phosphate | 30 | 65 | 31 | 45 | 100 | 100 | 100 | | 97 |
| 2-(3,4-Dichlorobenzyloxycarbonyl)-1-methyl-vinyl dimethyl phosphate | 10 | 85 | 35 | 65 | 100 | 100 | 100 | | 97 |
| Dimethyl 1-methyl-2-(2,3,4,5,6-pentachlorobenzyloxycarbonyl)vinyl phosphate | 30 | 30 | 25 | | 99 | 99 | 100 | | 87 |
| 2-(p-Chloro-alpha-methylbenzyloxycarbonyl)-1-methylvinyl dimethyl phosphate | | | | | 91 | 100 | 100 | | 57 |

The compounds of this invention can be employed for insecticidal purposes by the use of any of the methods which are conventionally employed in the art. For example, the compounds can either be sprayed or otherwise applied in the form of a solution or dispersion, or they can be absorbed on an inert, finely divided solid and applied as a dust. Useful solutions for application by spraying, brushing, dipping, and the like, can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatine, casein, long-chain fatty alcohols, alkyl aryl sulfonates, long-chain alkyl sulfonates, phenolethylene oxide condensates, $C_{12}$ to $C_{20}$ amines and ammonium salts, and the like. These solutions can be employed as such, or more preferably, they can be dispersed or emulsified in water and the resulting aqueous dispersion or emulsion applied as a spray. Solid carrier materials which can be employed include, talc, bentonite, lime, gypsum, pyrophyllite and similar inert solid diluents. If desired, the compounds of the present invention can be employed as aerosols, as by dispersing the same into the atmosphere by means of a compressed gas.

The concentration of the compounds to be used with the above carriers is dependent upon many factors, including the particular compound utilized, the carrier employed, the method and conditions of application, and the insecticide species to be controlled, a proper consideration and resolution of these factors being within the skill of those versed in the insecticide art. In general, however, the compounds of this invention are effective in concentrations of from about 0.01 to 0.5% based upon the total weight of the composition though under some circumstances as little as about 0.00001% or as much as 2% or even more of the compound can be employed with good results from an insecticidal standpoint.

When employed as an insecticide, a compound of this invention can be employed either as the sole toxic ingredient or the insecticidal composition or it can be employed in conjunction with the other insecticidally-active materials. Representative insecticides of this latter class include the naturally-occurring insecticides such as pyretrum, rotenone, sabadilla, and the like, as well as the various synthetic insecticides, including DDT, benzene hexachloride, thiodiphenylamine, cyanides, tetraethyl pyrophosphate, diethyl-p-nitrophenyl thiophosphate, azobenzene, and the various compounds of arsenic lead, and/or fluorine.

Having thus described this invention what is desired to be protected by United States Letters Patent is:

1. A compound of the general formula

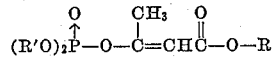

wherein R is selected from the group consisting of halogenated mononuclear aryl and halogenated mononuclear aralkyl radicals wherein the alkyl moiety contains from 1 to 5 carbon atoms, and R' is an alkyl radical of from 1 to 5 carbon atoms.

2. Dialkyl 2-(halophenyloxycarbonyl)-1-methylvinyl phosphate wherein each of the alkyl groups contains from 1 to 5 carbon atoms.

3. Dialkyl 2-(halophenylalkyloxycarbonyl)-1-methylvinyl phosphate wherein each of the alkyl groups and the alkyl moiety of the halophenylalkyloxy group contains from 1 to 5 carbon atoms.

4. 2-(p-chlorophenoxycarbonyl)-1-methylvinyl dimethyl phosphate.

5. 2-(o-chlorobenzyloxycarbonyl)-1-methylvinyl dimethyl phosphate.

6. 2-(2,4-dichlorobenzyloxycarbonyl)-1-methylvinyl dimethyl phosphate.

7. 2-(3,4-dichlorobenzyloxylcarbonyl)-1-methylvinyl dimethyl phosphate.

8. 2-(p-chloro-alpha-methylbenzyloxycarbonyl)-1-methylvinyl dimethyl phosphate.

9. The method of combating insects which comprises applying to insect habitats a compound of claim 1.

10. The method of combating insects which comprises applying to insect habitats a compound of claim 2.

11. The method of combating insects which comprises applying to insect habitats a compound of claim 3.

12. Dialkyl 2-(halobenzyloxycarbonyl)-1-methylvinyl phosphate.

13. As an insecticidal composition of matter a compound of claim 1 supported upon a finely divided inert carrier material, the concentration of said compound being from about 0.00001 to about 2 percent of the combined weights of said compound and said carrier material.

14. As an insecticidal composition of matter a compound of claim 1 disseminated in an inert horticultrual carrier liquid, the concentration of said compound being from about 0.00001 to about 2 percent of the combined weights of said compound and said carrier material.

References Cited in the file of this patent

UNITED STATES PATENTS

| | | |
|---|---|---|
| 2,582,204 | Kosolapoff | Jan. 8, 1952 |
| 2,802,855 | Whetstone | Aug. 13, 1957 |
| 2,816,128 | Allen | Dec. 10, 1957 |
| 2,826,529 | Shapiro | Mar. 11, 1958 |
| 2,830,069 | Smith | Apr. 8, 1958 |
| 2,838,478 | Hillyer | June 10, 1958 |
| 2,842,497 | Watson | July 8, 1958 |